Patented Dec. 24, 1940

2,226,357

UNITED STATES PATENT OFFICE 2,226,357

MANUFACTURE OF POLYCARBOXYLIC ACIDS

John F. Olin, Grosse Ile, and Frederick P. Fritsch, Wyandotte, Mich., assignors to The Sharples Solvents Corporation, Philadelphia, Pa., a corporation of Delaware No Drawing. Application November 16, 1938, Serial No. 240,854

10 Claims. (Cl. 260—537)

The present invention pertains to the manufacture of polycarboxylic acid, such as adipic acid, glutaric acid, methyl-adipic acids, etc., which have heretofore been produced by oxidation of cyclo-aliphatic alcohols. While the oxidation of cyclo-aliphatic alcohols to produce polycarboxylic acids produces a satisfactory product, processes of this character are relatively expensive.

An object of the present invention has been to afford a process by which such acids can be cheaply produced.

A second object of the invention has been to afford a process by which these acids can be produced by direct treatment of cyclo-aliphatic olefins.

Another object of the invention has been to afford a process by which polycarboxylic acids may be produced from a starting material consisting of a cyclo-paraffin or a mixture of cyclo-paraffins.

A more specific object of the invention has been to afford a process by which adipic acid and related acids may be produced from a starting material consisting of cyclohexane, which may be obtained from petroleum. A novel feature of the invention consists in production of polycarboxylic acids by sulfation of cyclo-aliphatic olefins and direct oxidation of the sulfation products of the olefins by means of nitric acid, potassium permanganate, manganese dioxide, lead peroxide, potassium dichromate, or other oxidizing agent.

The invention rests upon the discovery that, when cyclo-hexene and related compounds are sulfated and the cyclohexyl hydrogen sulfate, the di-cyclohexyl sulfate, or mixture of cyclohexyl hydrogen sulfate and di-cyclohexyl sulfate is oxidized, polycarboxylic acids of good quality and in satisfactory yield are produced.

The invention will be best understood by consideration of the following discussion of an illustrative example of preparing adipic acid by treatment of cyclohexane.

In the practice of the invention, cyclohexane, which may be derived from petroleum, may first be halogenated to produce a cyclohexyl halide. The cyclohexyl halide is thereafter subjected to a splitting reaction, to split off the hydrogen halide from the cyclohexyl halide molecule and produce cyclohexene. The halogenation of the cyclohexane may involve chlorination in the liquid or vapor phase by methods well known in the art. This chlorination may be carried to substantial completion, but it is preferred that the cyclohexane be reacted with an amount of chlorine substantially less than that theoretically required to produce a reaction product in which all of the cyclohexane is mono-chlorinated, since by underchlorinating in this manner, the production of undesired polychlor cyclohexane is avoided. The splitting operation to remove hydrogen chloride and produce cyclohexene may be performed on the entire chlorinated reaction product, consisting of monochlor cyclohexane and unreacted cyclohexane resulting from the chlorination reaction before the splitting operation is accomplished.

The splitting of the cyclohexyl chloride reaction mixture may be accomplished by heating that mixture to a temperature in excess of 150° C. in the presence of a base such as a sodium hydroxide solution, solid sodium hydroxide, lime or lime solution, a tertiary amine such as triamylamine, quinoline or other tertiary base, or an oxide of an alkali metal or alkaline earth metal.

At the conclusion of the splitting reaction, the cyclohexene produced by that reaction is sulfated by sulfuric acid of appropriate concentration. In case the material subjected to the splitting reaction contains cyclohexane, it is preferred that this cyclohexane be passed to the sulfating reaction together with the cyclohexene produced by splitting, since the cyclohexane acts as a diluent in connection with the step of sulfation, and cyclohexane can be removed by stratification as an insoluble layer above the cyclohexyl hydrogen sulfate.

The sulfation of the cyclohexene produced by the splitting reaction may be accomplished by treatment of that cyclohexene, or the mixture thereof with cyclohexane, with sulfuric acid of 70 to 80% concentration at temperatures between zero and 20° C, and the mixture should be artificially cooled during the sulfation reaction to avoid polymerization of the cyclohexene. The amount of sulfuric acid to effect sulfation of the cyclohexane should amount to more than one-half mol of sulfuric acid to every mol of cyclohexene in the material to be sulfated, in order to insure the conversion of the bulk of the cyclohexene to cyclohexyl hydrogen sulfate, or di-cyclohexyl sulfate.

The mixture of cyclohexyl hydrogen sulfate and di-cyclohexyl sulfate obtained by sulfation of the cyclohexene is next oxidized. This oxidation may be accomplished, for example, by treatment of the mixture with nitric acid of appropriate concentration, the sulfated mixture being preferably dropped into the nitric acid solution. The nitric acid solution may also contain an oxidation catalyst such as vanadic acid, manganese, chromium, cerium, lead, cobalt, iron, copper, nickel, vanadium, tungsten, magnesium, or compounds of the above metals, such as nitrates, oxides, or sulfates thereof. The nitric acid solution used to accomplish oxidation may vary in concentration between 30 and 70% but nitric acid of between 40 and 60% concentration has been found best for the practice of the process, and the very best results have been obtained in connection with use of nitric acid of approximately 50% concentration. When nitric acid is used as the oxidizing agent, the oxidation reaction is best accomplished at temperatures between 40 and 70° C., preferably between 55 and 60° C.

After the completion of the oxidation reaction, the reaction mass is cooled to a temperature sufficiently low to crystallize the adipic acid from solution, and the adipic acid is then removed from the remainder of the reaction mass by filtration. The filtrate of crude adipic acid so obtained may then be further purified by solution in concentrated nitric acid and cooling of that solution to effect recrystallization and removal of the adipic acid therefrom.

While the invention has been described above with specific reference to production of adipic acid by treatment of cyclohexane or cyclohexene, the process of the invention is quite generally applicable to the production from cyclo-paraffins and cyclo-olefins of polycarboxylic acids. Thus, for example, the process of the invention may be employed to produce glutaric acid from cyclopentane or cyclopentene by the general sequence of steps described above, it may be employed to produce methyl adipic acid by treatment of methyl cyclohexane, or methyl cyclohexene, and it may be employed to produce alkyl-substituted adipic acids in general by a similar technique by employing the alkyl-substituted cyclohexanes or cyclohexenes as starting materials.

It will be understood that the invention is not limited to the technique described above, by which the cyclo-paraffin is used as the starting material, since cyclo-olefins, such as cyclohexene, methyl cyclohexene or cyclopentane, may be produced by other methods and sulfated, and then oxidized within the scope of the invention. Thus, cyclohexene obtained as a by-product in connection with hydrolysis of cyclohexyl chloride to produce cyclohexyl alcohol may be used for the practice of the steps of sulfation and oxidation. Cyclohexene to be used in the practice of the process may also be obtained by cracking cyclohexane or fractions containing cyclohexane with the aid of heat and catalysts.

Instead of oxidizing the sulfated mixture by means of nitric acid, other oxidizing agents may be used. Thus, the sulfated mixture may be oxidized by treatment with potassium permanganate, potassium dichromate, manganese dioxide, lead peroxide, or other suitable oxidizing agent. In case oxidation is accomplished with the aid of one of these oxidizing agents, the temperature should be kept down to a point of 20° C. or below, in order to prevent over-oxidation of the mixture and production of undesired by-products.

*Example*

Cyclohexane was chlorinated in the liquid phase to produce a mixture containing a large proportion of cyclohexyl monochloride. The mixture was subjected to a splitting reaction by treatment with a sodium hydroxide solution of 18% concentration at a temperature of 170° C., this splitting reaction being conducted in a steel autoclave. The cyclohexene resulting from the splitting reaction was treated with an equal volume of 74% sulfuric acid at a temperature which varied between 4 and 10° C. during the sulfation reaction. The resulting sulfated mixture was oxidized by adding it dropwise into a 50% nitric acid solution containing a catalyst consisting of 0.1% vanadic acid, based upon the amount of dilute nitric acid present. The oxidation reaction was carried out at a temperature which varied between 55 and 60° C. during the course of the reaction. After the oxidation reaction was completed, the reaction mass was cooled to a temperature between zero and 5° C., and the precipitated adipic acid was removed from the remainder of the reaction mixture by suction filtration. The filtrate was then dissolved in concentrated nitric acid, cooled by 0° C., to precipitate it from solution, separated from the nitric acid by filtration, and washed with cold water. The yield of adipic acid based upon the amount of cyclohexene employed was 52.4%, and this yield can be improved by recovering adipic acid from the remaining reaction liquids, a technique not practiced in the present specific example. After crystallizing the resulting adipic acid from water, the final product had a melting point of 151° C.

Attempts were made to effect oxidation of cyclohexene directly, without the intermediate step of sulfation, but these attempts yielded principally nitration products, with very little formation of adipic acid.

Modifications will be obvious to those skilled in the art and we do not, therefore, wish to be limited, except by the scope of the sub-joined claims.

We claim:

1. The process of preparing a polycarboxylic acid which comprises the step of oxidizing a cycloaliphatic sulfate.

2. The process of preparing a polycarboxylic acid which comprises the step of oxidizing a cycloaliphatic hydrogen sulfate.

3. The process of preparing a polycarboxylic acid which comprises the step of oxidizing a dicyclo-aliphatic sulfate.

4. The process of preparing a polycarboxylic acid which comprises the step of oxidizing a cycloaliphatic sulfate in the presence of nitric acid.

5. The process of preparing a polycarboxylic acid which comprises the steps of sulfating a cycloaliphatic olefin and thereafter oxidizing the resulting cyclo-aliphatic sulfate.

6. The process of preparing adipic acid which comprises the step of oxidizing a cyclohexyl sulfate.

7. The process of preparing adipic acid which comprises the step of oxidizing cyclohexyl hydrogen sulfate.

8. The process of preparing adipic acid which comprises the step of oxidizing cyclohexyl di-sulfate.

9. The process of preparing adipic acid which comprises the step of oxidizing a cyclohexyl sulfate in the presence of nitric acid.

10. The process of preparing adipic acid which comprises the steps of sulfating cyclohexene and thereafter oxidizing the resulting cyclohexyl sulfate.

JOHN F. OLIN.
FREDERICK P. FRITSCH.